United States Patent
Yap et al.

(10) Patent No.: US 10,593,372 B2
(45) Date of Patent: Mar. 17, 2020

(54) DEHUMIDIFYING DEVICES, AND DATA STORAGE DEVICES HAVING ONE OR MORE DEHUMIDIFYING DEVICES

(71) Applicant: Seagate Technology LLC, Cupertino, CA (US)

(72) Inventors: Pow Ming Yap, Block (SG); Noppavit Yongrattana, Samut Prakarn (TH); Hao Sun, Upper Cross Street (SG); Ying Su, Block (SG); Jun Long Lim, Block (SG); Kyi Ayar Oo, Queenstown (SG); Kok Liang Cho, Melaka (MY); Alice Kim Tai Chin, Block (SG); Chee Xian Lee, Tampines Central (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/041,389

(22) Filed: Jul. 20, 2018

(65) Prior Publication Data
US 2020/0027665 A1    Jan. 23, 2020

(51) Int. Cl.
*G11B 33/14* (2006.01)
(52) U.S. Cl.
CPC ......... *G11B 33/14* (2013.01); *G11B 33/1453* (2013.01)
(58) Field of Classification Search
None
See application file for complete search history.

(56) References Cited

U.S. PATENT DOCUMENTS

| | | | |
|---|---|---|---|
| 4,967,295 A | 10/1990 | Yamauchi et al. | |
| 5,012,360 A * | 4/1991 | Yamauchi ......... | G11B 33/1453 236/44 E |
| 5,059,291 A * | 10/1991 | Yamauchi ............. | B01D 53/26 204/252 |
| 5,096,549 A * | 3/1992 | Yamauchi ............. | B01D 53/26 204/229.2 |
| 5,118,261 A * | 6/1992 | Yamauchi ............. | B01D 53/26 204/242 |
| 5,302,270 A * | 4/1994 | Yamauchi ............ | B01D 53/326 204/265 |
| 6,054,230 A | 4/2000 | Kato | |
| 6,723,464 B2 | 4/2004 | Tabata et al. | |

(Continued)

FOREIGN PATENT DOCUMENTS

JP    02001004 A * 1/1990
JP    02164418 A * 6/1990
(Continued)

OTHER PUBLICATIONS

"Where are electric micro-dehumidifiers used?", retrieved on Jul. 20, 2018 via http://www.rosahl.co.uk/, (5 pages).
(Continued)

*Primary Examiner* — William J Klimowicz
(74) *Attorney, Agent, or Firm* — Kagan Binder, PLLC

(57) ABSTRACT

The present disclosure relates to dehumidifying devices and data storage devices that include a dehumidifying device. A dehumidifying device can include first and second electrical terminals that are located on the same side of the dehumidifying device to easily couple the terminals to electrical connections external to the data storage device such as a printed circuit board assembly.

11 Claims, 14 Drawing Sheets

(56) References Cited

U.S. PATENT DOCUMENTS

| | | | |
|---|---|---|---|
| 6,989,493 B2* | 1/2006 | Hipwell, Jr. | G11B 33/12 |
| | | | 174/151 |
| 7,019,942 B2* | 3/2006 | Gunderson | G11B 25/043 |
| | | | 360/99.15 |
| 7,411,763 B2* | 8/2008 | Wu | G11B 5/4846 |
| | | | 360/264.2 |
| 7,460,333 B2 | 12/2008 | Akamatsu et al. | |
| 7,478,760 B2 | 1/2009 | Beatty et al. | |
| 7,695,547 B2 | 4/2010 | Smith | |
| 8,098,454 B2* | 1/2012 | Kouno | G11B 33/1466 |
| | | | 360/99.21 |
| 2006/0066974 A1* | 3/2006 | Akamatsu | G11B 33/14 |
| | | | 360/69 |
| 2006/0171065 A1* | 8/2006 | Akamatsu | G11B 33/1453 |
| | | | 360/97.12 |
| 2008/0144273 A1* | 6/2008 | Mewes | G11B 33/121 |
| | | | 361/679.37 |
| 2015/0096884 A1 | 4/2015 | Shealy et al. | |

FOREIGN PATENT DOCUMENTS

| | | | | | |
|---|---|---|---|---|---|
| JP | 10156130 | A | * | 6/1998 | |
| JP | 11169642 | A | * | 6/1999 | ............. F24F 3/147 |
| JP | 2004223474 | A | * | 8/2004 | |
| JP | 2006142234 | A | * | 6/2006 | |

OTHER PUBLICATIONS

"Electrolysis type Dehumidifying element / Dehumidifier", retrieved on Jul. 20, 2018 via http://www.ryosai.co.jp/products/spec/file/ROSAHL_English_catalog.pdf, prepared in Sep. 2014m (8 pages).
Unpublished United States Utility U.S. Appl. No. 15/954,135, filed Apr. 16, 2018.

* cited by examiner

DEHUMIDIFYING DEVICES, AND DATA STORAGE DEVICES HAVING ONE OR MORE DEHUMIDIFYING DEVICES

BACKGROUND

The present disclosure relates to managing the relative humidity within electronic devices such as data storage devices that use electrical power to store and retrieve data.

SUMMARY

Embodiments of the present disclosure include a dehumidifying device comprising:
 a) a housing comprising a first major side and a second major side, wherein the first major side is opposite the second major side; and
 b) a membrane electrode assembly disposed within the housing, wherein the membrane electrode assembly comprises:
  i) an anode;
  ii) a cathode;
  iii) a hydrogen ion conductor disposed between the anode and the cathode;
  iv) a first electrical terminal electrically coupled to the anode; and
  v) a second electrical terminal electrically coupled to the cathode, wherein the anode is exposed through an opening on the first major side of the housing, wherein the first electrical terminal is exposed through an opening on the second major side of the housing, and wherein the second electrical terminal is exposed through an opening on the second major side of the housing.

Embodiments of the present disclosure also include a data storage device comprising:
 a) a data storage device housing having one or more walls that define a housing interior and a housing exterior;
 b) a dehumidifying device mounted to a housing wall, wherein the dehumidifying device comprises:
  i) a dehumidifying device housing comprising a first major side and a second major side, wherein the first major side is opposite the second major side; and
  ii) a membrane electrode assembly disposed within the dehumidifying device housing, wherein the membrane electrode assembly comprises:
   A) an anode;
   B) a cathode;
   C) a hydrogen ion conductor disposed between the anode and the cathode;
   D) a first electrical terminal electrically coupled to the anode; and
   E) a second electrical terminal electrically coupled to the cathode,
  wherein the anode is exposed through an opening on the first major side and faces the housing interior of the data storage device housing, wherein the first electrical terminal is exposed through an opening on the second major side, and wherein the second electrical terminal is exposed through an opening on the second major side of the housing.

DETAILED DESCRIPTION

Figure 1A:
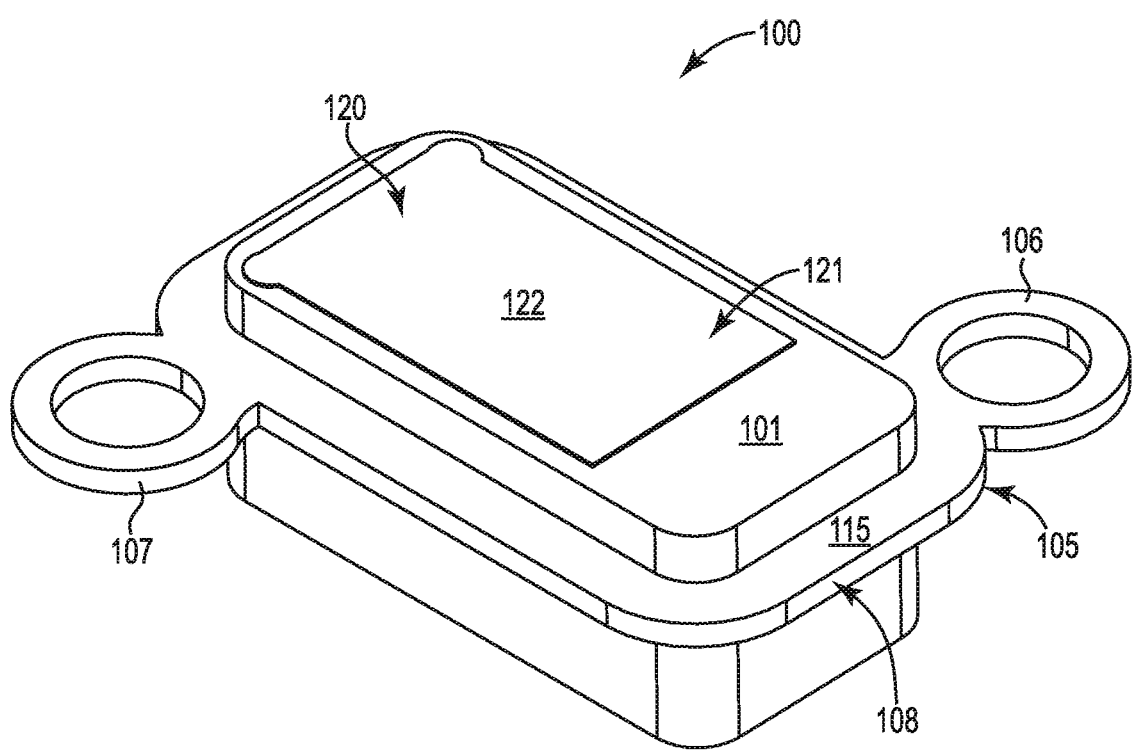
FIG. 1A is a schematic, perspective view showing one embodiment of a dehumidifying device according to the present disclosure.
Figure 1B:
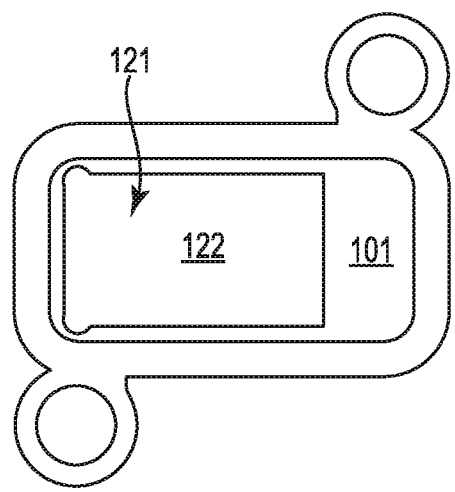
FIG. 1B is a view of a first major side of the dehumidifying device shown in FIG. 1A.
Figure 1C:
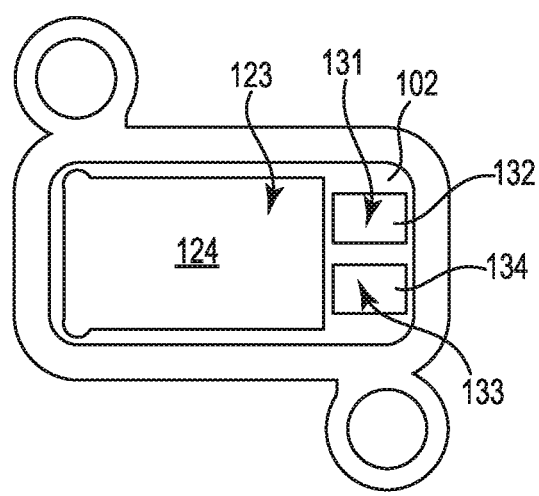
FIG. 1C is a view of a second major side of the dehumidifying device shown in FIG. 1A.
Figure 1D:
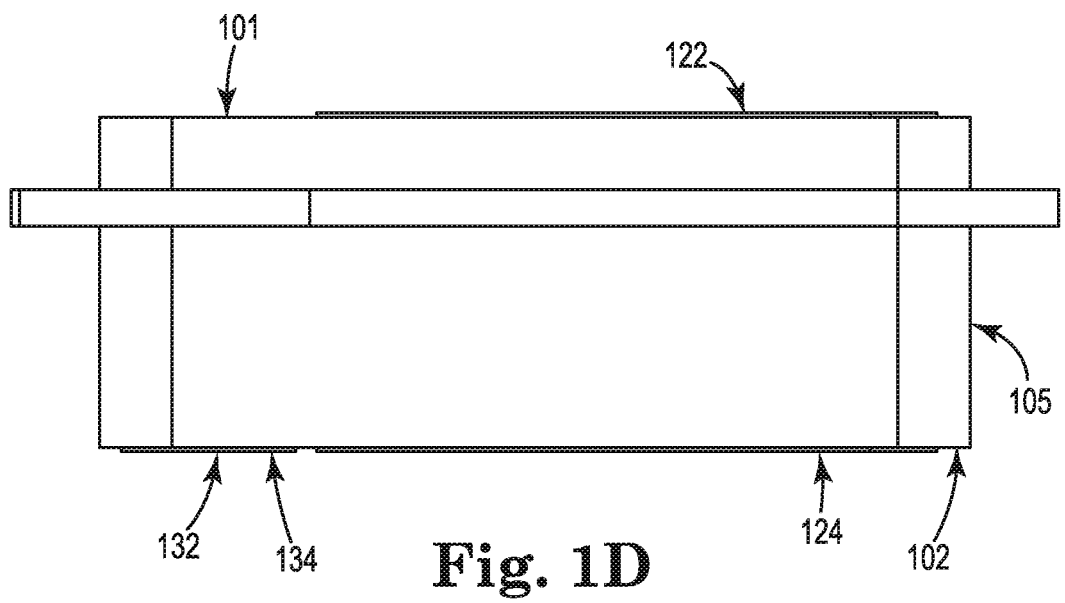
FIG. 1D is an elevation view of the dehumidifying device shown in FIG. 1A.
Figure 1E:
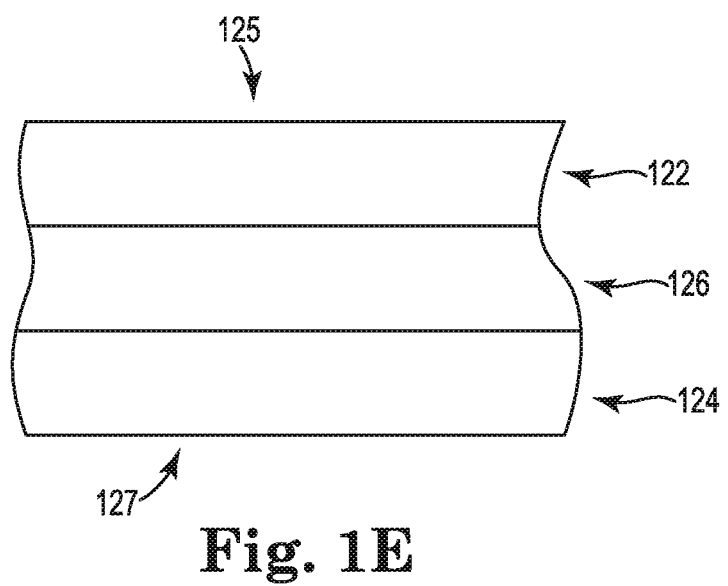
FIG. 1E is a partial, cross-section schematic of an MEA shown in FIG. 1A.

Embodiments of the present disclosure include a dehumidifying device having a membrane electrode assembly.

A membrane electrode assembly (MEA) can include a cathode, an anode, and a hydrogen ion conductor, and can function as a dehumidifying element for an enclosure by electrically coupling the cathode and anode to a power source. An MEA can be configured by including a hydrogen ion conductor (e.g., a polymer electrolyte membrane (PEM)) sandwiched between two electrodes, namely the anode and the cathode. When an electric potential is applied across the MEA, water molecules can be electrolyzed into hydrogen ($H^+$) and oxygen ($O^{2-}$) ions on the anode side, which can be positioned to face the inside of an enclosure. The hydrogen ion conductor can function as a hydrogen ion exchange membrane and move the hydrogen ions to the cathode side, which can be positioned to face outside the enclosure (e.g., the ambient environment). On the cathode side, the hydrogen ions can react with oxygen in air to form water molecules. Thus, the enclosure is dehumidified by moving the moisture from the anode side of the MEA to the cathode side.

A wide variety of hydrogen ion conductors can be used in connection with the present disclosure. For example, a hydrogen ion conductor can be made of a solid polymer electrolyte or a solid macromolecule electrolyte such as an ion exchange resin. The hydrogen ion conductor can be in the form of a membrane positioned between the cathode and anode.

An anode and a cathode according to the present disclosure can each be gas diffusion electrodes that are made of a porous material (e.g., porous carbon paste including platinum catalysis) bonded to the interface of the hydrogen ion conductor, e.g., by press-contact or vapor deposition so as to sandwich the hydrogen ion conductor.

An anode and cathode may be made of a wide variety of electrically conductive materials. An example of such conductive material includes particulate carbon and a polymeric binder. The conductive material can optionally include a catalytic material dispersed thereon that is selected to catalyze the desired reaction at the electrode. For example, the conductive material may include a platinum (Pt) catalyst dispersed therein to catalyze the oxidation of protons ($H^+$) to form water. An anode may include a catalyst for the reduction of water, such as a mixture of Pt metal and an iridium compound (e.g., iridium oxide). Other metals or metal compounds that are useful as catalysts for the electrodes (cathode and anode) will be apparent to those of skill in the art. The electrodes may be prepared using known methods in the art, such as those described in U.S. Pat. No. 6,054,230 by Kato and U.S. Pat. No. 6,723,464 by Tabata et al.

Examples of membrane electrode assemblies are described in, e.g., U.S. Pat. No. 4,967,295 (Yamauchi et al.) and U.S. Pat. No. 7,460,333 (Akamatsu et al.); and U.S. Pub. No. 2015/0096884 (Shealy et al.), wherein the entireties of said patent documents are incorporated herein by reference.

Membrane electrode assemblies are commercially available, e.g., under the tradename ROSAHL electrolytic dehumidifier having model number RD3 or RD4.

One embodiment of a membrane electrode assembly according to the present disclosure is described with respect to FIGS. 1A-1E. FIGS. 1A-1E show a dehumidifying device 100 that includes a housing 105 and a MEA 120 disposed within the housing 105.

A housing can be configured to house the MEA and be mounted to a data storage device. As shown, housing 105 includes first major side 101 (dehumidifying side) and a second major side 102. The first major side 101 is opposite the second major side 102.

An MEA housing can be made out a wide variety of materials suitable for housing an MEA and being mounted to a data storage device. In some embodiments, as shown in FIGS. 1A-1E, housing 105 can be a unitary piece of plastic material made by injection molding.

A housing 105 can be mounted to a data storage device using a wide variety of techniques so that the device 100 can remove moisture from the data storage device. In some embodiments, a housing 105 can include on or more mounting structures that can be used to mount the device 100 to a data storage device enclosure, e.g., with a fastener and/or adhesive. In some embodiments, as shown in FIGS. 1A-1E, housing 105 includes mounting tabs 106 and 107 that extend away from an exterior perimeter 108 of housing lip 115 to mount the device 100 to a data storage device enclosure, e.g., with a fastener and/or adhesive. As described below, a fastener such as a screw can be inserted through the hole in each of tabs 106 and 107 to mount the device 100 to an enclosure of a data storage device. FIG. 2 shows another embodiment of a dehumidifying device 200 that includes a housing 205 having a first major side 201 and an MEA 220 disposed within the housing 205. As can be seen, device 200 does not include mounting tabs that extend away from an exterior perimeter 208 of the housing 205. Instead, housing 205 includes two holes 211 and 212 so that fasteners such as screws can extend through holes 211 and 212 to mount device 200 to a data storage device. By comparing device 100 and 200, it can be seen that having mounting tabs 106 and 107 that extend away from an exterior perimeter 108 of the housing 105 can reduce the footprint of device 100 so as to save space when positioning device with respect to other components associated with a data storage device.

As shown in FIGS. 1A-1E, membrane electrode assembly 120 includes an anode 122 (dehumidifying side); a cathode 124; and a hydrogen ion conductor 126 disposed between the anode 122 and the cathode 124. Although not shown, one or more optional layers of material can be included in MEA 220. For example, one or more gas diffusion layers can be included in MEA 220 such as on opposite sides 125 and 127 of anode 122 and cathode 124, respectively. Gas diffusion layers can include porous carbon cloth.

Figure 2:
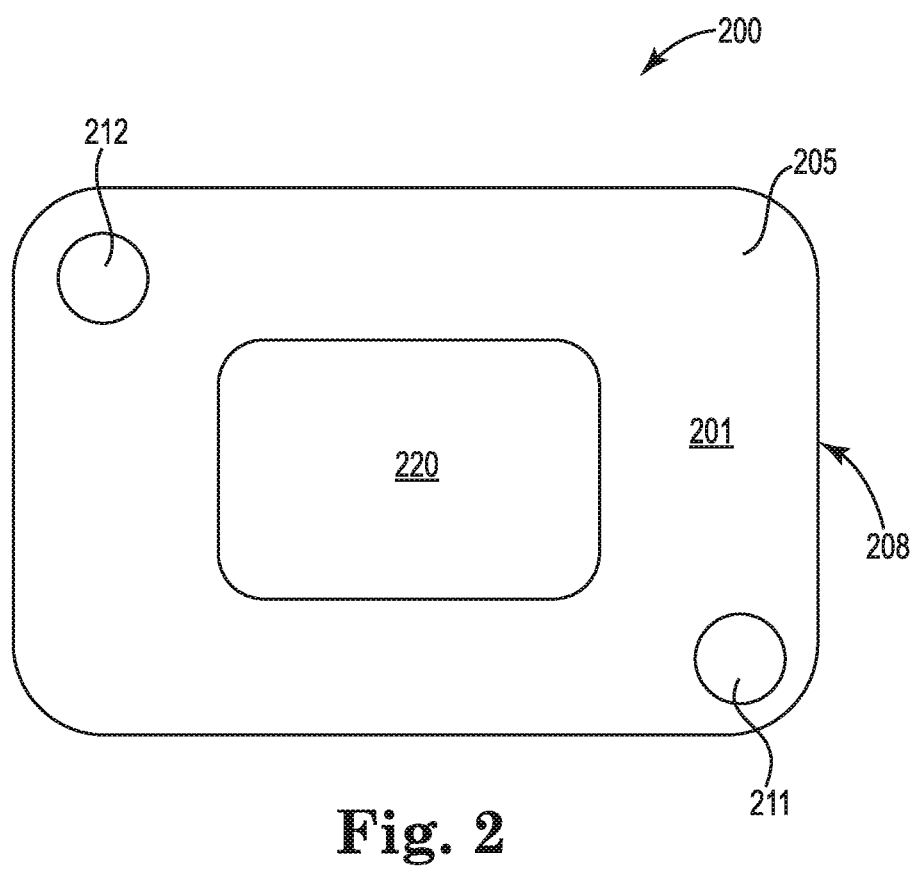
FIG. 2 is a schematic view of a first major side of a second embodiment of a dehumidifying device according to the present disclosure.

As shown in FIG. 1A, the anode 122 is exposed through an opening 121 on the first major side 101 of the housing 105, and the cathode 124 is exposed through an opening 123 on the second major side 102 of the housing 105.

Membrane electrode assembly also includes a first electrical terminal 132 electrically coupled to the anode 122, and a second electrical terminal 134 electrically coupled to the cathode 124 so that the anode 122 and 124 can be connected to an electric potential that is applied across the MEA 220 and allow water molecules to be electrolyzed into hydrogen ($H^+$) and oxygen ($O^{2-}$) ions on the anode 122 side.

An MEA according to the present disclosure can locate the electrical terminals for both the cathode and the anode on the cathode side of the MEA so that the terminals can be connected to electrical connections (e.g., on a printed circuit board assembly (PCBA)) in a relatively direct manner that can help avoid short circuiting. Such a configuration can also facilitate compact configurations, e.g., with respect to form factors such as a hard disk drive (HDD). A cathode and electrical terminals can be exposed through the same or different openings on the same side of the dehumidifying device. As shown, the first electrical terminal 132 is exposed through opening 131 on the second major side 102 of the housing 105, and the second electrical terminal 134 is exposed through opening 133 on the second major side 102 of the housing 105. Also, the cathode 124 is exposed through a third opening 123 on the second major side 102 of the housing 105. The electrical terminals 132 and 134 can be located on the second major side 102 in a manner that facilitates electrically coupling the terminals 132 and 134 to a power source. As show, the first electrical terminal 132 and second electrical terminal 134 are located adjacent to each other.

Figure 4:
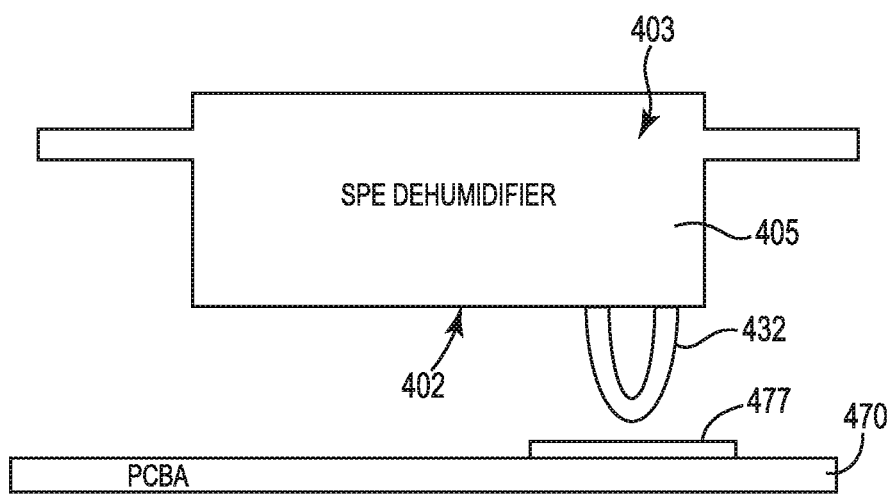
FIG. 4 is an alternative, partial, schematic, elevation view of a dehumidifying device according to the present disclosure electrically coupled to a printed circuit board.

The structure of the electrical terminals can also be selected to facilitate electrical connection to a power source. In some embodiments, one or more of the electrical terminals can be a flat surface of electrically conductive material. An example of such a flat surface can be seen with respect to terminals 132 and 134 in FIG. 1C. In some embodiments, one or more of the electrical terminals can include an electrically conductive member that extends away from a major side of the housing. An example of such a terminal can be seen in FIG. 4, where dehumidifying device 403 includes electrical terminal 432 in the form of an electrically conductive member that extends away from second major side 402 (cathode side) of the housing 405. As shown, electrical terminal 432 is in physical and electrical contact with a flat surface 477 of electrically conductive material on printed circuit board assembly 470.

Dehumidifying devices according to the present disclosure can used to control humidity within the interior of data storage devices. Non-limiting examples of data storage devices include hard disk drives (internal and/or external), network attached storage (NAS), and the like. Examples of hard disc drives are reported in U.S. Pat. No. 7,478,760 (Beatty et al.) and U.S. Pat. No. 7,695,547 (Smith), wherein the entireties of which patents are incorporated herein by reference.

An example of using a dehumidifying device according to the present disclosure to control the humidity of a data storage device is illustrated with respect a hard disk drive 300 and FIGS. 3A-3H, which includes dehumidifying device 100 described above.

Hard disk drive 300 includes a hard disk drive housing 310 having one or more walls that define a housing interior 304 and a housing exterior 306. As shown, hard disk drive housing 310 includes a top cover 311 and base 312, and side walls 313, 314, 315, and 316 so as to define housing interior 304 and housing exterior 306. It is noted that base 312 can be nonplanar and have one or more components mounted to the exterior 306 side of base 312 (e.g., printed circuit board assembly 370).

Figure 3A:
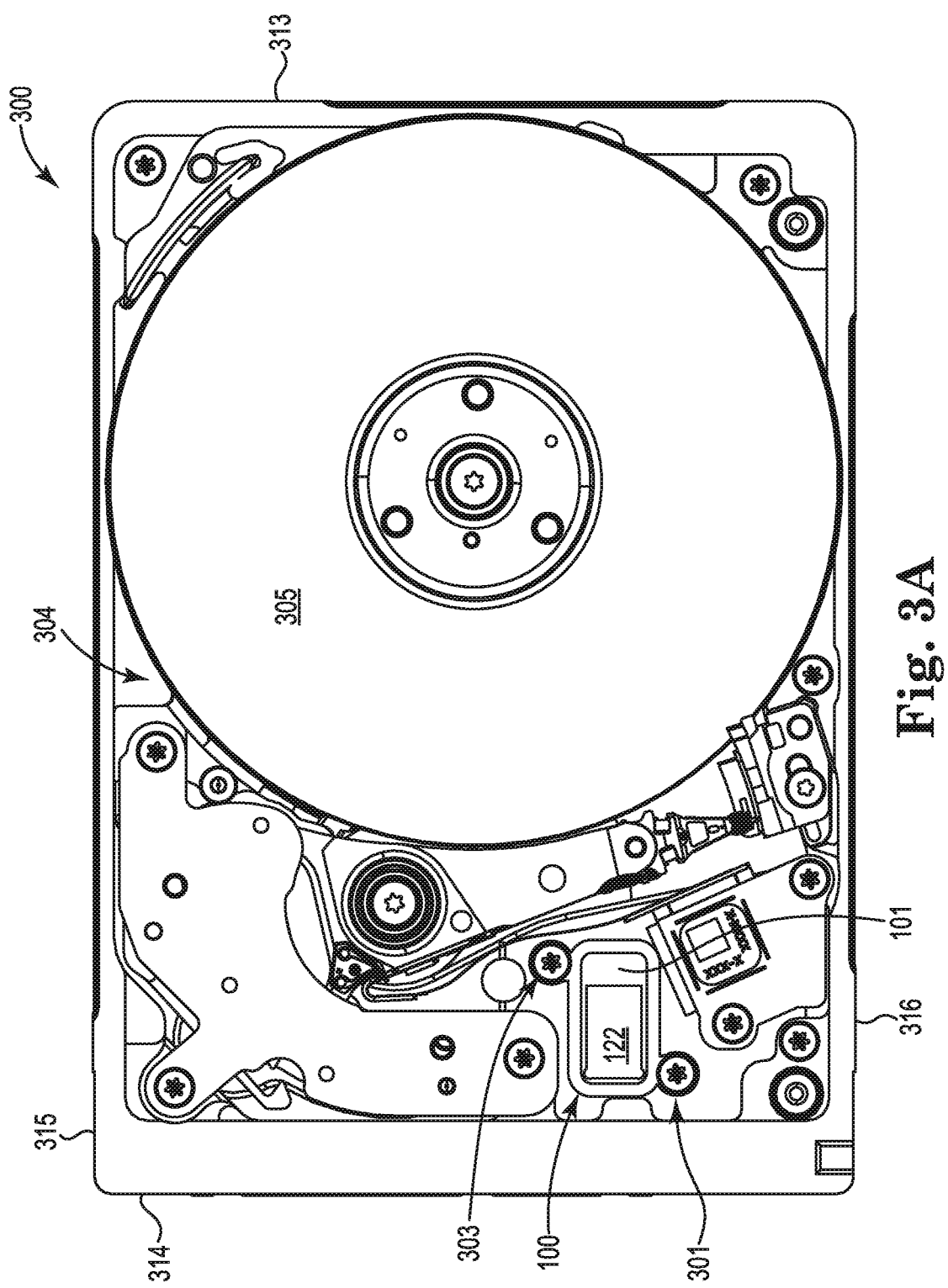
FIG. 3A is a schematic, top partial view of an interior of hard disk drive that includes the dehumidifying device shown in FIGS. 1A-1D with the anode exposed to the interior of the hard disk drive.
Figure 3B:
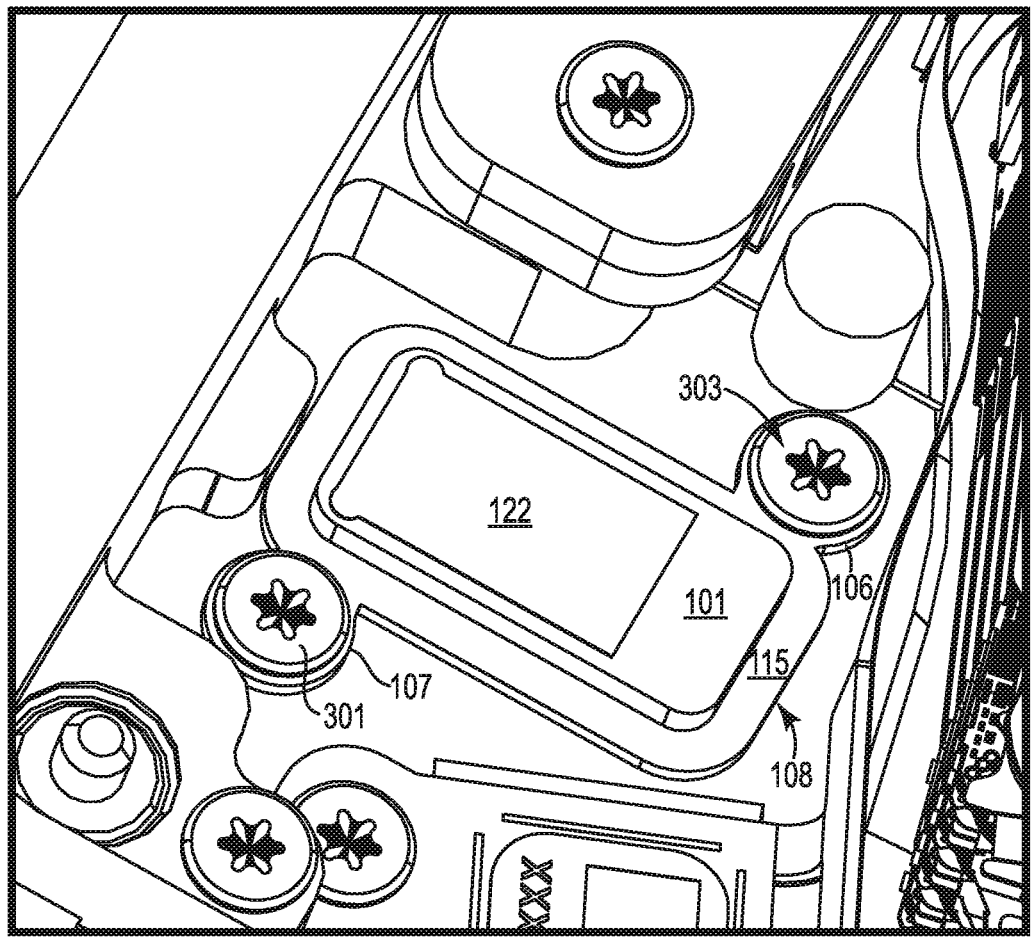
FIG. 3B is a partial, close-up view of the interior of the hard disk drive shown in FIG. 3A.
Figure 3C:
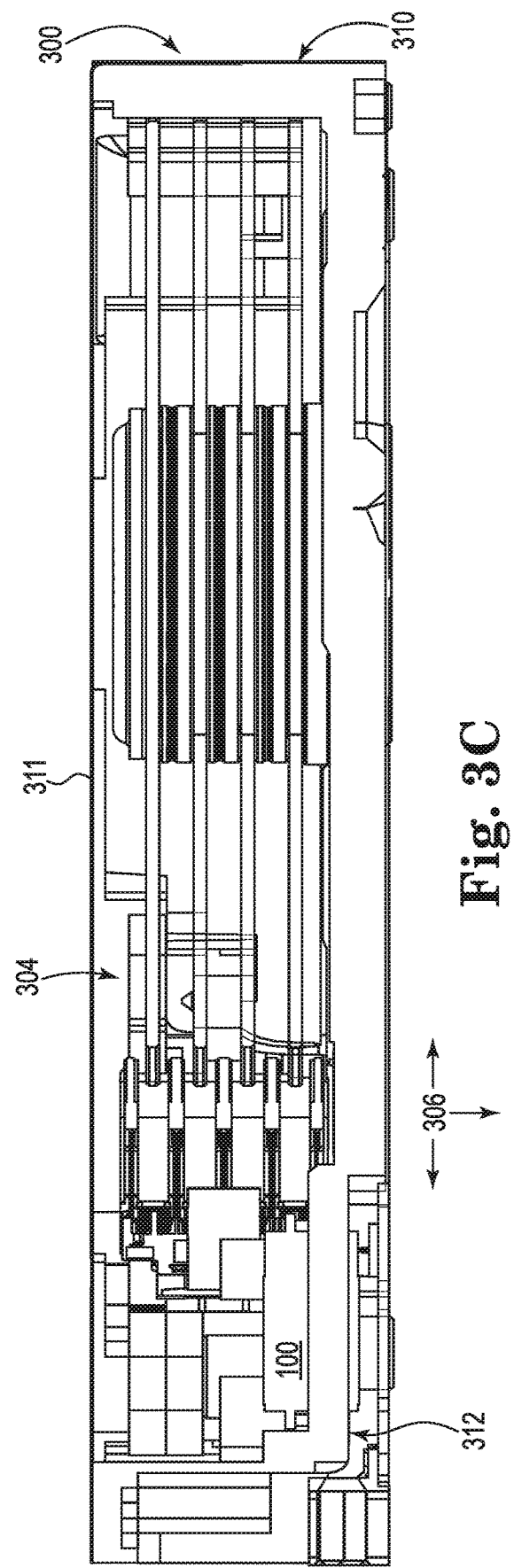
FIG. 3C is a partial, elevation view of the hard disk drive shown in FIG. 3A.
Figure 3D:
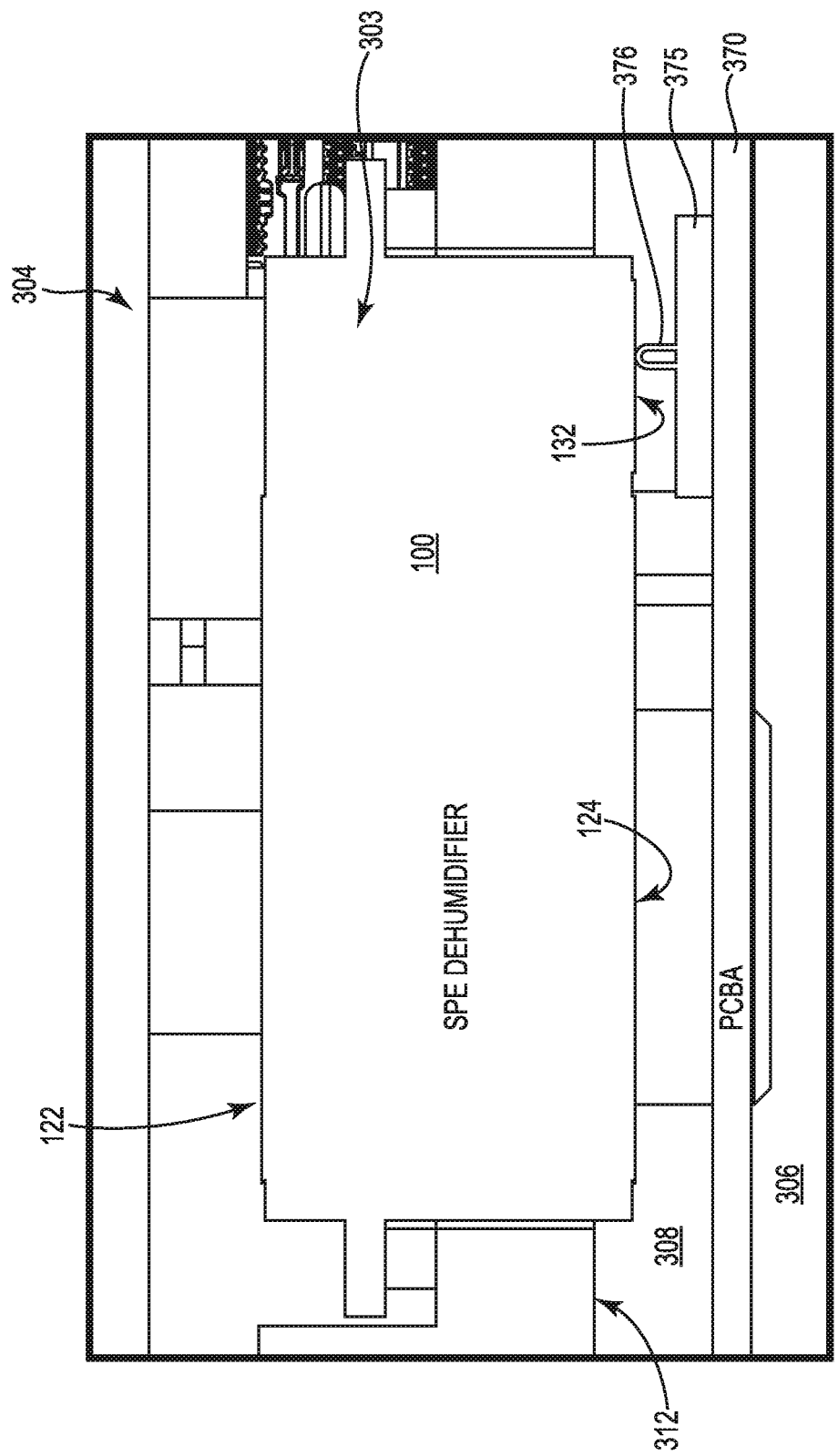
FIG. 3D is a partial, close-up view of the hard disk drive shown in FIG. 3C.
Figure 3E:
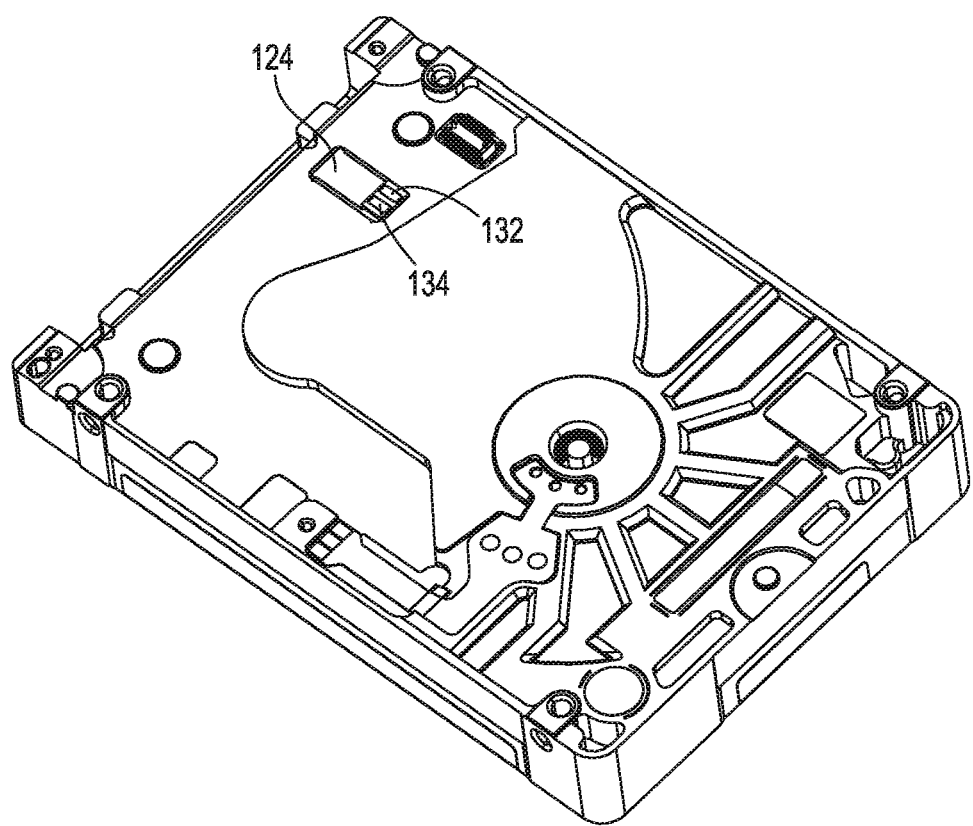
FIG. 3E is a partial, bottom view of the hard disk drive shown in FIG. 3A with the printed circuit board removed.

A dehumidifying device according to the present disclosure can be mounted to a housing wall in a manner so that the dehumidifying device can connect to a power source and dehumidify the interior of the hard disk drive. As shown, dehumidifying device 100 can be mounted in an opening of base 312 so that anode 122 faces the housing interior 304 of the hard disk drive 300. As shown in FIG. 3E, the cathode 124, first electrical terminal 132, and second electrical terminal face the housing exterior 306 of the hard disk drive 300. As shown in FIGS. 3A and 3B, the housing lip 115 can be in contact the base 312 to facilitate mounting device 100 to hard disk drive 300. The mounting tabs 106 and 107 that extend away from an exterior perimeter 108 of the housing 105 have screws 303 and 301, respectively, inserted through the hole in each of tabs 106 and 107 to mount the device 100 to hard disk drive. Optionally, if desired, an adhesive can be applied between lip 115 and base 312.

Hard disk drive 300 also includes a printed circuit board assembly 370 mounted thereto. As shown in FIG. 3D, the printed circuit board assembly 370 includes a connector 375 that has two electrical contacts 376. The printed circuit board assembly 370 is positioned so that one electrical contact 376 faces and is in electrical contact with the first electrical terminal 132 and so that the other electrical contact 376 faces and is in electrical contact with the second electrical terminal 134. As shown in FIGS. 3D and 3E, the first electrical terminal 132 and second electrical terminal each include a flat surface of electrically conductive material, and each electrical contact 376 includes an electrically conductive member that extends away from the printed circuit board assembly 370 and physically contacts the first electrical terminal 132 and the second electrical terminal 134, respectively.

Figure 3F:
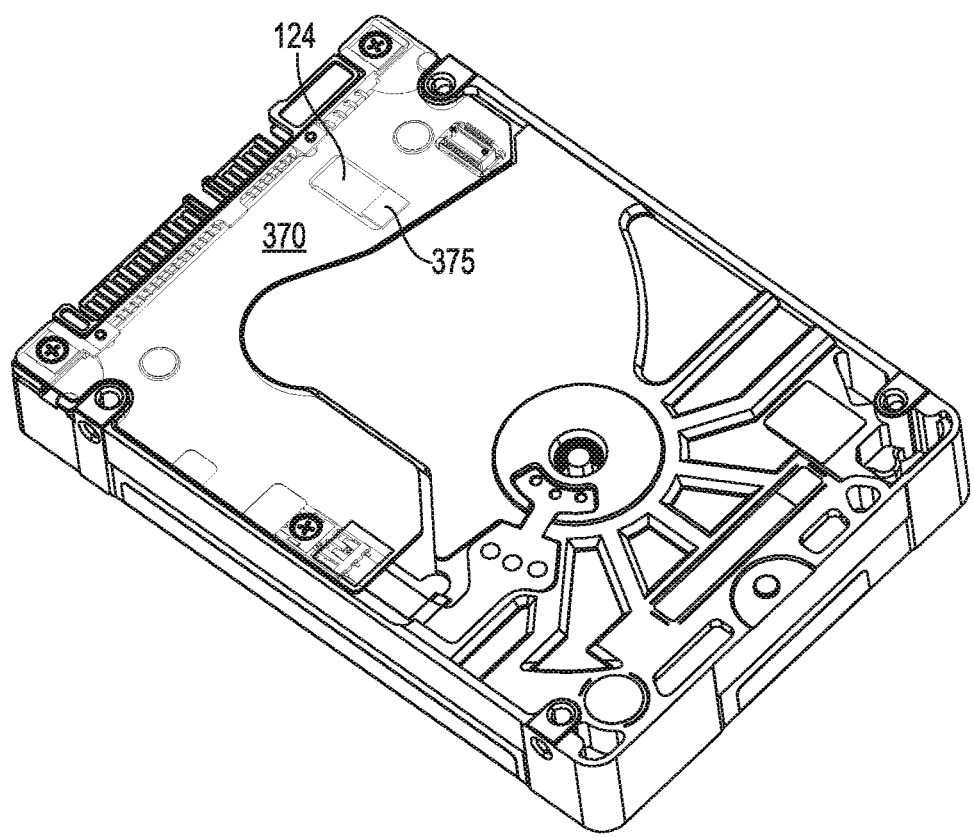
FIG. 3F is a partial, bottom view of the hard disk drive shown in FIG. 3A with the printed circuit board made transparent.
Figure 3G:
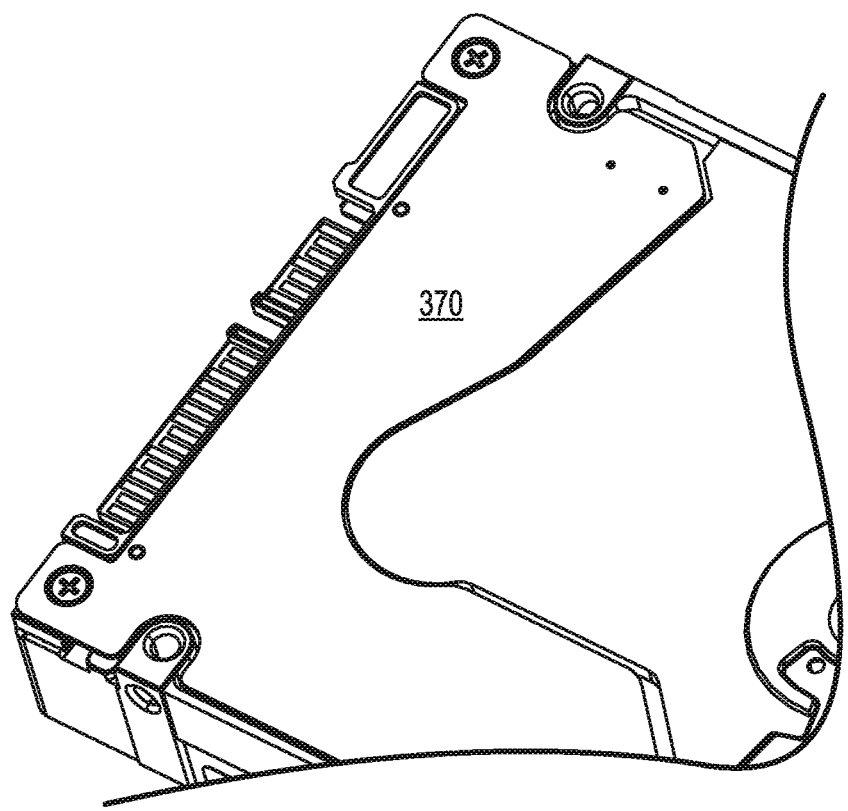
FIG. 3G is a partial, close-up, bottom view of the hard disk drive shown in FIG. 3A with the printed circuit board mounted thereto.
Figure 3H:
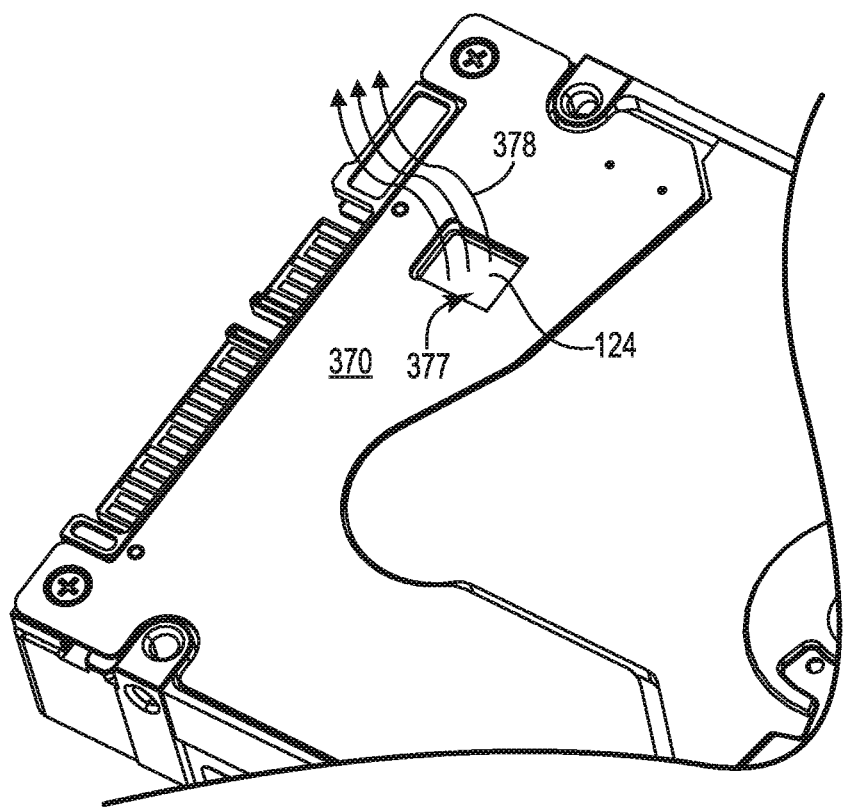
FIG. 3H is an alternative, partial, close-up, bottom view of the hard disk drive shown in FIG. 3A with the printed circuit board mounted thereto.

FIG. 3G shows a bottom view of hard disk drive 300 with the printed circuit board assembly 370 mounted to hard disk drive 300. FIG. 3F shows the same illustration of FIG. 3G, but printed circuit board assembly 370 is transparent, except for connector 375, so that the cathode 124 can be seen. Referring to FIG. 3D, it can be seen that the exterior 306 of hard disk drive 300 is in fluid communication with space 308 so that the cathode 124 of dehumidifying device 100 has access to oxygen and can discharge water vapor into space 308 and ultimately space 306. Optionally, as shown in FIG. 3H, printed circuit board assembly 370 can include an opening 377 directly over cathode 124 to expose the cathode 124 directly to exterior space 306 and allow the cathode to discharge directly to exterior 306 as indicated by arrows 378.

The printed circuit board assembly can be connected to an external power source (e.g., direct current) to operate dehumidifying device 100.

A dehumidifying device according to the present disclosure can provide one or more advantages in addition to the advantages already discussed herein. For example, a dehumidifying device according to the present disclosure can permit a data storage device such as a hard disk drive to be designed to allow some gas to flow between the exterior and interior while still maintaining a desirable relative humidity. Allow some gas flow to between the datas storage device housing interior and exterior can allow the interior to adjust to changes in ambient air pressure that may occur so as to avoid undue movement of the housing (casing) due to the ambient pressure moving the housing if the ambient pressure is too high relative to interior pressure. As another example, a dehumidifying device according to the present disclosure can permit relatively very low interior relative humidity be obtained, which can be desirable in heat-assisted magnetic recording (HAMR) technologies.

What is claimed is:

1. A data storage device comprising:
   a) a data storage device housing having one or more walls that define a housing interior and a housing exterior;
   b) a dehumidifying device mounted to a housing wall, wherein the dehumidifying device comprises:
      i) a dehumidifying device housing comprising a first major side and a second major side, wherein the first major side is opposite the second major side; and
      ii) a membrane electrode assembly disposed within the dehumidifying device housing, wherein the membrane electrode assembly comprises:
         A) an anode;
         B) a cathode;
         C) a hydrogen ion conductor disposed between the anode and the cathode;
         D) a first electrical terminal electrically coupled to the anode; and
         E) a second electrical terminal electrically coupled to the cathode,
   wherein the anode is exposed through an opening on the first major side and faces the housing interior of the data storage device housing, wherein the cathode is exposed through an opening on the second major side and faces the housing exterior, wherein the first electrical terminal is exposed through an opening on the second major side, and wherein the second electrical terminal is exposed through an opening on the second major side of the housing; and
   c) a printed circuit board assembly mounted to the data storage device, wherein the printed circuit board assembly comprises a first electrical contact and a second electrical contact, wherein the printed circuit board assembly is positioned so that the first electrical contact faces and is in electrical contact with the first electrical terminal and so that the second electrical contact faces and is in electrical contact with the second electrical terminal, wherein the printed circuit board assembly has an opening overlying the cathode so that when power is supplied to the dehumidifying device moisture can pass from the cathode through the opening in the printed circuit board assembly.

2. The data storage device of claim 1, wherein the first electrical terminal comprises a flat surface of electrically conductive material and/or the second electrical terminal comprises a flat surface of electrically conductive material.

3. The data storage device of claim 1, wherein the first electrical terminal comprises an electrically conductive member that extends away from the second major side of the housing and/or the second electrical terminal comprises an electrically conductive member that extends away from the second major side of the housing.

4. The data storage device of claim 1, wherein the first electrical terminal comprises a flat surface of electrically conductive material and the first electrical contact comprises an electrically conductive member that extends away from the printed circuit board assembly and physically contacts the first electrical terminal and/or the second electrical terminal comprises a flat surface of electrically conductive material and the second electrical contact comprises an electrically conductive member that extends away from the printed circuit board assembly and physically contacts the second electrical terminal.

5. The data storage device of claim 1, wherein the first electrical terminal comprises an electrically conductive member that extends away from the second major side and the first electrical contact comprises a flat surface of electrically conductive material that physically contacts the electrically conductive member of the first electrical terminal and/or the second electrical terminal comprises an electrically conductive member that extends away from the second major side and the second electrical contact comprises a flat surface of electrically conductive material that physically contacts the electrically conductive member of the second electrical terminal.

6. The data storage device of claim 1, wherein the first electrical terminal is exposed through a first opening on the second major side of the dehumidifying device housing, the second electrical terminal is exposed through a second opening on the second major side of the dehumidifying device housing, and the cathode is exposed through a third opening on the second major side of the dehumidifying device housing, wherein the first opening, second opening, and third opening are different from each other.

7. The data storage device of claim 1, wherein the first electrical terminal and second electrical terminal are located adjacent to each other.

8. The data storage device of claim 1, wherein the dehumidifying device housing further comprises one or more mounting tabs that extend away from an exterior perimeter of the dehumidifying device housing.

9. The data storage device of claim 8, wherein the one or more mounting tabs each comprise a through-hole, and further comprising a fastener extending through each through-hole and coupled to the data storage device housing wall to mount the dehumidifying device to the data storage device housing.

10. The data storage device of claim 1, wherein the anode comprises a porous electrode, the cathode comprises a porous electrode, and the hydrogen ion conductor comprises a solid, polymer, electrolyte membrane.

11. The data storage device of claim 1, wherein the data storage device is a hard disk drive.

* * * * *